United States Patent
Banks et al.

(10) Patent No.: US 9,677,391 B2
(45) Date of Patent: Jun. 13, 2017

(54) PRESSURE RELIEF DEVICE, SYSTEM, AND METHOD

(71) Applicant: Oklahoma Safety Equipment Company, Inc., Broken Arrow, OK (US)

(72) Inventors: David Wayne Banks, Broken Arrow, OK (US); Robert Frank Evans, Jenks, OK (US); Doyle G. Stockstill, Broken Arrow, OK (US)

(73) Assignee: Oklahoma Safety Equipment Company, Inc., Broken Arrow, OK (US)

( * ) Notice: Subject to any disclaimer, the term of this patent is extended or adjusted under 35 U.S.C. 154(b) by 149 days.

(21) Appl. No.: 13/671,509

(22) Filed: Nov. 7, 2012

(65) Prior Publication Data

US 2013/0126152 A1     May 23, 2013

Related U.S. Application Data

(60) Provisional application No. 61/556,773, filed on Nov. 7, 2011.

(51) Int. Cl.
*E21B 43/26* (2006.01)
*F16K 17/16* (2006.01)
(Continued)

(52) U.S. Cl.
CPC ............ *E21B 43/26* (2013.01); *E21B 34/063* (2013.01); *F16K 17/1606* (2013.01); *Y10T 137/1692* (2015.04)

(58) Field of Classification Search
CPC ........ E21B 43/114; E21B 43/26; F16K 17/16; F16K 17/40
(Continued)

(56) References Cited

U.S. PATENT DOCUMENTS 3,108,636 A * 10/1963 Peterson ................... 166/308.1
3,484,817 A    12/1969 Wood
(Continued)

FOREIGN PATENT DOCUMENTS

| CN | 1347486 A | 5/2002 |
| CN | 1623029 A | 6/2005 |
| CN | 201273266 Y | 7/2009 |

OTHER PUBLICATIONS

Notification of Transmittal of the International Search Report and the Written Opinion of the International Searching Authority, or the Declaration from the International Bureau of WIPO for corresponding International Application No. PCT/US2012/063997, dated Jan. 22, 2013, 13 pages.
(Continued)

*Primary Examiner* — Kenneth L Thompson
(74) *Attorney, Agent, or Firm* — Fitch, Even, Tabin & Flannery LLP

(57) ABSTRACT

A pressure relief device and a hydraulic fracturing system having a pressure relief device are provided. In one form, the pressure relief device has a valve body with a linearly extending throughbore between the inlet and outlet thereof. A rupture disc is secured in the valve body so that a frangible dome wall portion thereof has a reverse-acting orientation in the valve body bore. The hydraulic fracturing system includes a pump and a delivery line that receives pressurized fracturing fluid from the pump and delivers it to a well. A pressure relief device is installed along the delivery line. A sensor detects fluid flow downstream of the pressure relief device which allows the pump to be shut down when the downstream fluid flow is detected. The pressure relief device can have a body with a domed rupture disc and the sensor therein.

18 Claims, 13 Drawing Sheets

(51) Int. Cl.
*F16K 17/40* (2006.01)
*E21B 34/06* (2006.01)

(58) Field of Classification Search
USPC ....... 166/269, 271, 263, 305.1, 308.01, 307,
166/177.5, 67, 317; 137/68.25, 68.26,
137/68.27
See application file for complete search history.

(56) References Cited

U.S. PATENT DOCUMENTS

| | | | | |
|---|---|---|---|---|
| 3,599,713 | A * | 8/1971 | Jenkins | 166/368 |
| 3,612,345 | A * | 10/1971 | Fike, Jr. | F16K 17/162 |
| | | | | 220/89.2 |
| 3,815,779 | A * | 6/1974 | Ludwig | F16L 23/006 |
| | | | | 220/89.2 |
| 3,831,680 | A * | 8/1974 | Edwards et al. | 166/311 |
| 3,906,977 | A * | 9/1975 | Summers | F16K 17/1613 |
| | | | | 137/71 |
| 4,073,402 | A * | 2/1978 | Wood | F16K 17/1606 |
| | | | | 137/68.26 |
| 4,085,764 | A | 4/1978 | Raidl, Jr. | |
| 4,102,167 | A * | 7/1978 | Wood | B21D 53/80 |
| | | | | 29/421.1 |
| 4,342,988 | A * | 8/1982 | Thompson et al. | 340/679 |
| 4,682,619 | A * | 7/1987 | Clift | F16K 17/1626 |
| | | | | 137/68.26 |
| 4,721,158 | A * | 1/1988 | Merritt et al. | 166/250.01 |
| 4,751,938 | A | 6/1988 | Kerns et al. | |
| 4,796,704 | A * | 1/1989 | Forrest et al. | 166/317 |
| 4,809,729 | A * | 3/1989 | Muddiman | 137/68.24 |
| 5,005,722 | A | 4/1991 | Short, III et al. | |
| 5,058,413 | A * | 10/1991 | Muddiman | 72/379.2 |
| 5,337,776 | A * | 8/1994 | Perry | F16K 17/162 |
| | | | | 137/1 |
| 5,388,646 | A * | 2/1995 | Hensley | 166/271 |
| 5,411,098 | A * | 5/1995 | Schmidt et al. | 166/369 |
| 5,617,921 | A * | 4/1997 | Schmidt et al. | 166/308.1 |
| 5,954,135 | A * | 9/1999 | Williamson et al. | 166/382 |
| 6,240,948 | B1 * | 6/2001 | Hansen, III | F16K 17/1606 |
| | | | | 137/68.19 |
| 6,378,544 | B1 * | 4/2002 | DiBello | 137/68.25 |
| 6,672,389 | B1 | 1/2004 | Hinrichs | |
| 6,935,424 | B2 * | 8/2005 | Lehman et al. | 166/250.1 |
| 7,640,988 | B2 * | 1/2010 | Phi et al. | 166/307 |
| 7,661,480 | B2 * | 2/2010 | Al-Anazi | 166/376 |
| 8,091,574 | B2 * | 1/2012 | Melrose et al. | 137/15.18 |
| 8,863,833 | B2 * | 10/2014 | Mescall et al. | 166/222 |
| 2003/0019277 | A1 | 1/2003 | Brazier et al. | |
| 2006/0196539 | A1 | 9/2006 | Raska et al. | |
| 2009/0173491 | A1 | 7/2009 | O'Brien | |
| 2010/0154894 | A1 | 6/2010 | Kotapish et al. | |
| 2010/0206570 | A1 | 8/2010 | Ocampos et al. | |
| 2010/0243072 | A1 | 9/2010 | Mcgraw et al. | |
| 2011/0000676 | A1 * | 1/2011 | Brandsdal | 166/317 |
| 2014/0151065 | A1 * | 6/2014 | Stephenson et al. | 166/374 |

OTHER PUBLICATIONS

Fluid End Parts List for "Well Servicing Pump" Model OPI-600, Triplex Pump, issued by Gardner Denver ®, Apr. 2007 (3 pages).
Partial supplementary European search report issued in corresponding European Application No. 12848619.8 dated May 9, 2016 (5 pages).
Office Action issued in corresponding Chinese Application No. 201280066365.3 dated Jan. 4, 2016 and English translation of same (8 pages).
Office Action issued in corresponding Chinese Application No. 201280066365.3 dated Aug. 23, 2016 and English translation of same (13 pages).

* cited by examiner

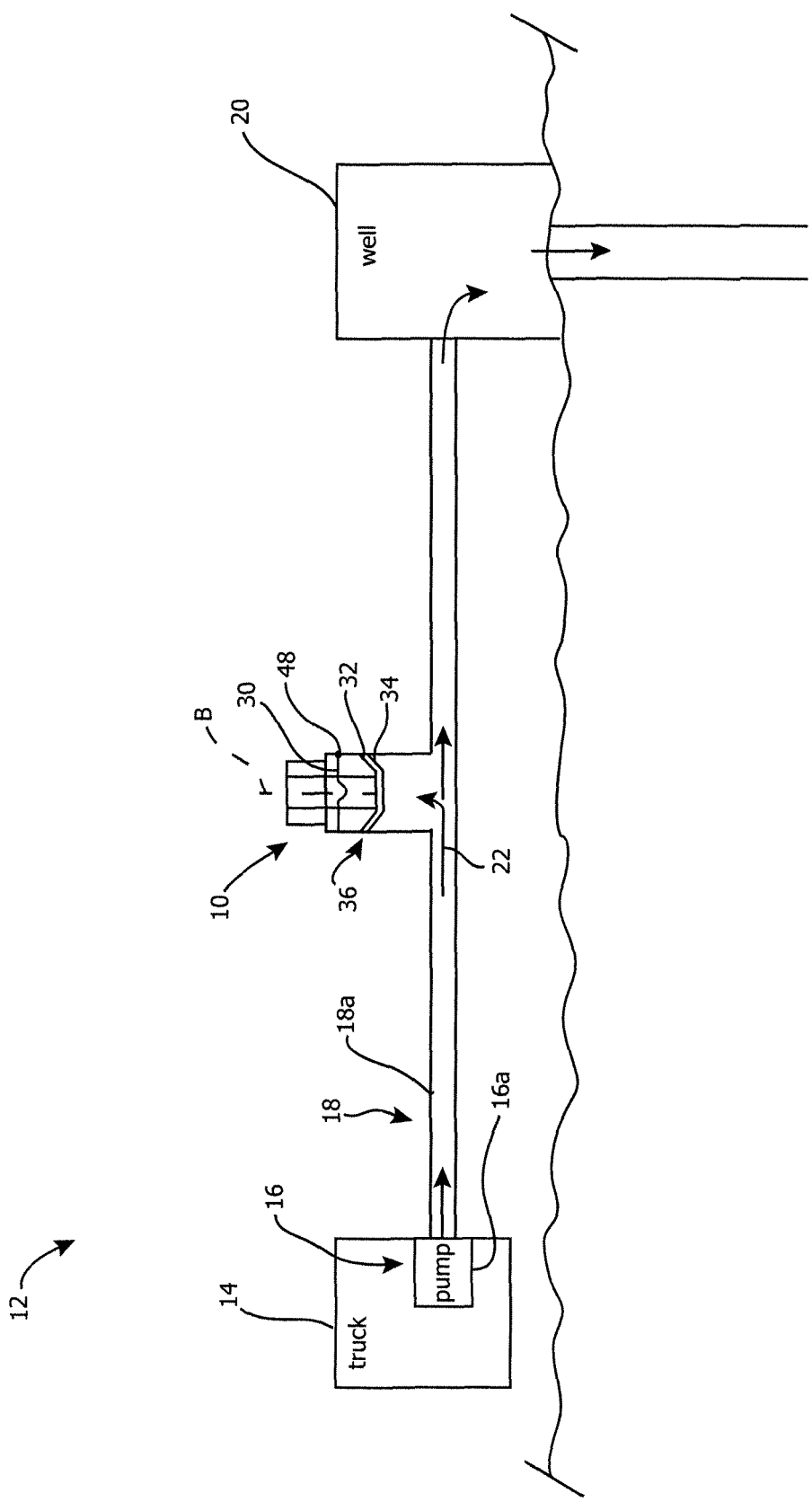

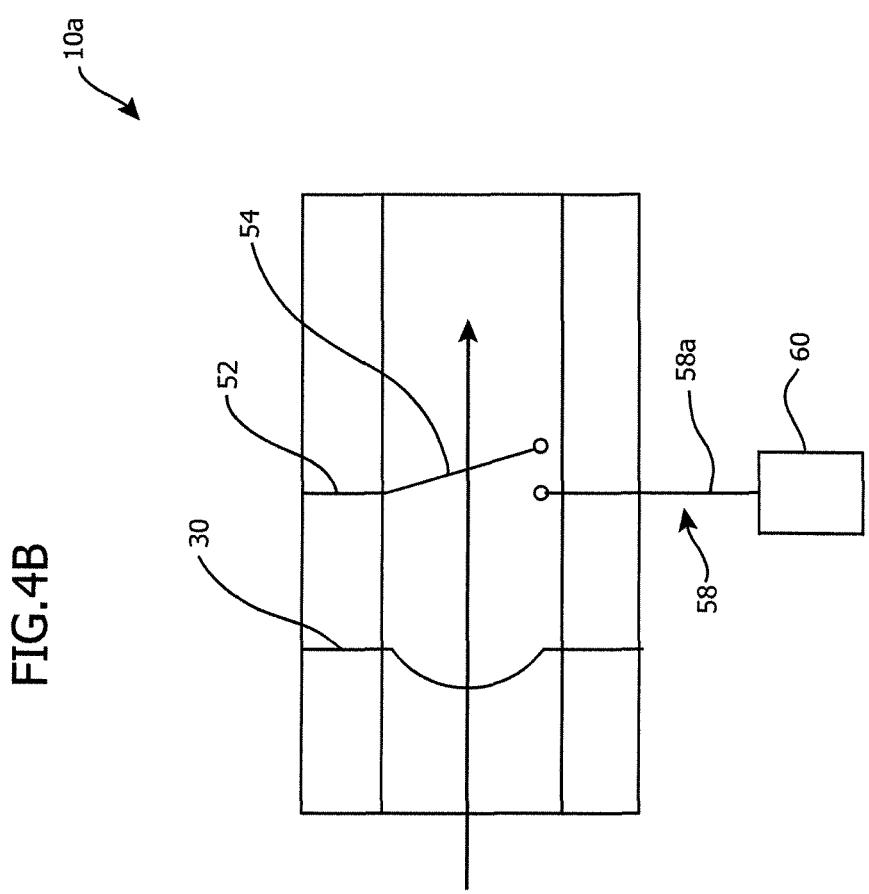

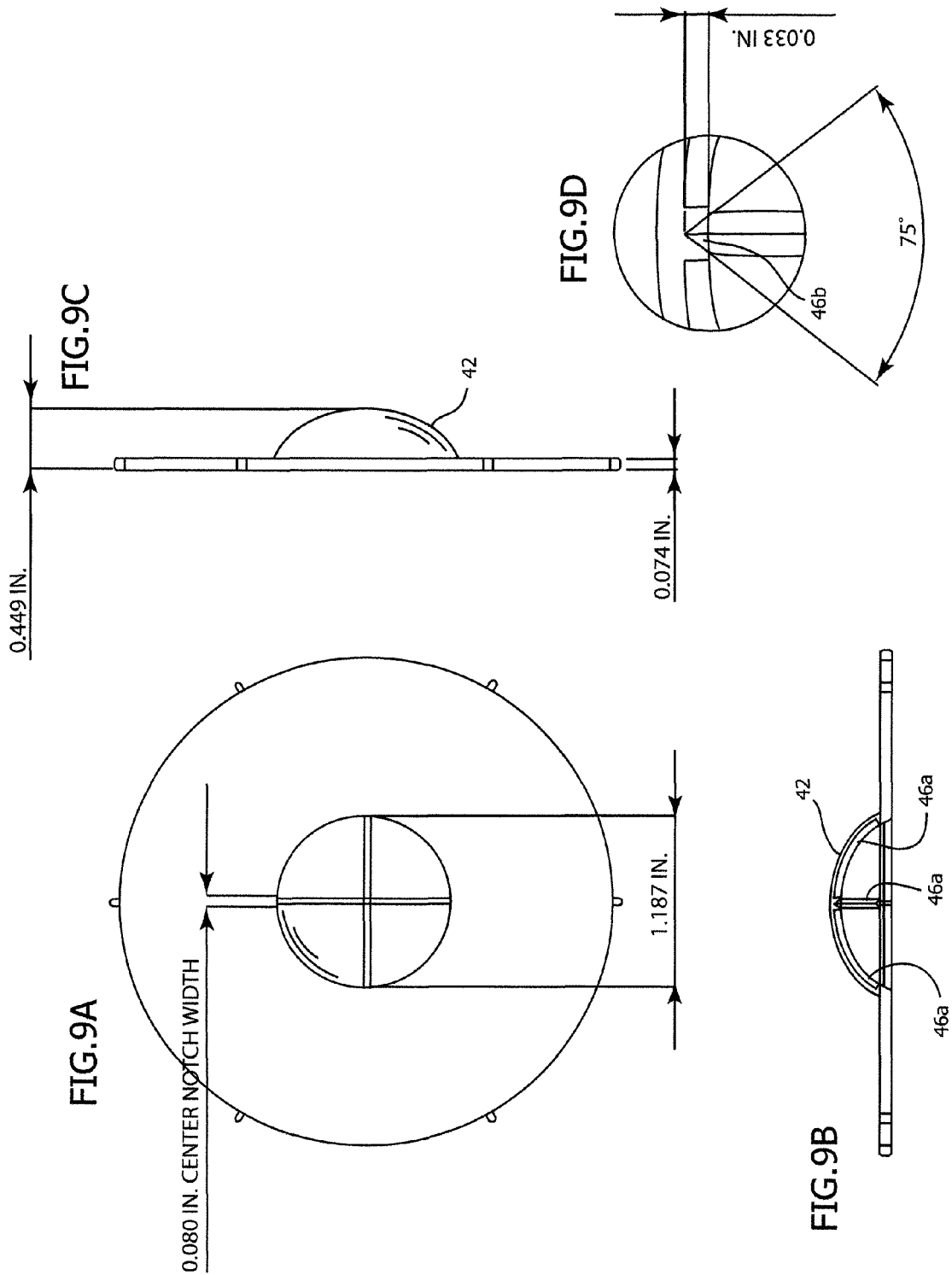

US 9,677,391 B2

PRESSURE RELIEF DEVICE, SYSTEM, AND METHOD

CROSS REFERENCE TO RELATED APPLICATION

This application claims benefit under 35 U.S.C. §119 (e) to U.S. Provisional Application No. 61/556,773 entitled "Pressure Relief Device, System, and Method" filed Nov. 7, 2011, the contents of which are incorporated herein by reference in its entirety.

FIELD OF THE INVENTION

The present invention relates to a pressure relief device, system, and method and, more particularly, to a rupture disc device for relieving pressure in a hydraulic fracturing fluid delivery system.

BACKGROUND OF THE INVENTION

Hydraulic fracturing, or fracking, is a process used to recover natural gas, oil, or other fossil fuels from rock layers deep below ground level. A typical hydraulic fracturing process includes multiple trucks pumping a pressurized liquid mixture of water, sand, and chemicals into a wellhead above the surface, which feeds into a wellbore extending below the surface to the desired depth. The wellbore includes casings that have perforated sections that allow the liquid to escape into the rock layer.

As the pressurized liquid is pumped through the wellbore below the surface, the pressurized liquid will be forced through the perforated sections and into the surrounding formation to cause the rock to fracture. The liquid will continue to flow into these fractures, creating fissures. During the process, the pressure of the liquid is monitored and the ratio of sand to water can be increased as the fracturing job progresses. The process maintains the highest pressure possible to ensure maximum fracturing in the rock.

When the fracturing process is complete, the pressure is reduced, and the liquid is released from the wellbore. The sand from the mixture remains within the fissures created by the fracturing, allowing the natural gas or oil to flow and be recovered.

Because of the nature of the process, fluid pumps and delivery lines that feed the fracking fluid into the wellbore operate under high pressure, such as approximately 6,000 to 15,500 psig. The pressure within the system is monitored to ensure that the system operates as desired. However, pressure spikes can occur throughout the system that if sufficiently high could cause piping to break or weaken, ultimately leading to subsequent breaking due to fatigue.

BRIEF DESCRIPTION OF THE DRAWINGS

FIG. 1 is a schematic view of a hydraulic fracturing system having a pressure relief device;

FIG. 4B is a schematic view showing the arrangement and operation of the pressure relief and detection device when the rupture disc has burst;

FIGS. 9A-9D are various views of the rupture disc showing exemplary dimensions thereof.

DETAILED DESCRIPTION OF THE PREFERRED EMBODIMENTS

Figure 2A:
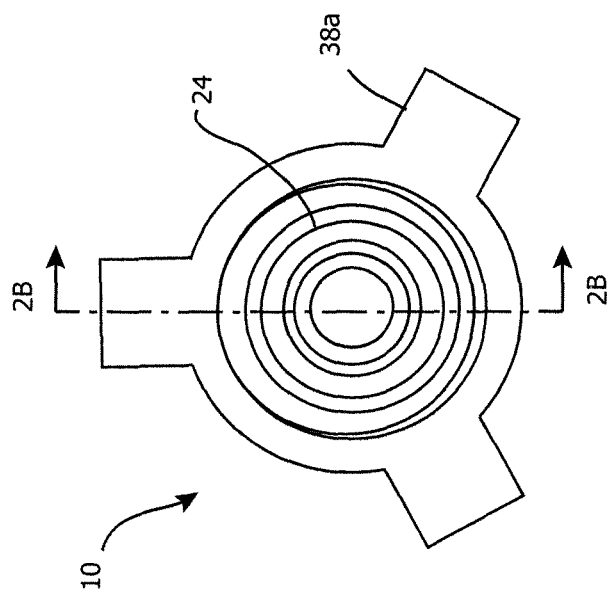
FIG. 2A is an end elevational view of a pressure relief device showing a device body coupled to a nut.

With reference to FIG. 1, a pressure relief device 10 is provided for relieving high pressure within a hydraulic fracturing, or fracking, system 12. The pressure relief device 10 can be connected as desired at different locations along the system 12 where pressure relief may be needed. The system 12 includes a pressurized fracturing fluid source which typically includes a fluid delivery truck 14 having a fluid end 16 that has a pump 16a for pressurizing the fracturing fluid. The pump 16a of the truck 14 is connected to a delivery line 18, which can include flexible and/or rigid pipes 18a, which are connected to a well 20. Typically, rigid pipes 18a will be utilized between the pump 16a and the well 20, while lower pressure, flexible conduits can be used as feed lines to the pump 16a. A fracturing fluid media 22, including water, sand, and chemicals, is pumped under pressure, e.g., approximately 5,500-16,000 psig, from the truck 14 into the well 20 at high pressure to perform the fracking job. The pressure relief device 10 can be connected along the delivery line 18, at the fluid end 16 of the truck 14, or can be located both at the fluid end 16 of the truck 14 and along the delivery line 18.

In one known fracking system, a pressure relief valve is provided having a rupture disc within a typical valve body. The rupture disc is generally made of metal, having a domed section that is scored on one side. The disc will burst at a specified pressure depending on various parameters including the thickness of the disc, the depth of the dome, and depth of scoring. The rupture disc is positioned within the valve adjacent the valve inlet between the process media and the valve body to protect the interior of the valve body. The rupture disc includes an elastomer seal within the valve body to prevent emissions into the atmosphere during normal operation of the system. The disc is forward acting, meaning that the concave side of the dome is installed facing the pressurized fracturing fluid. The relief valve is attached to the top of a delivery line, and since the relief valve uses a typical valve body, it has a ninety degree bend to vent.

In the event of a pressure spike above the burst pressure of the rupture disc, the disc will burst, allowing the over-pressurized fluid to escape to the atmosphere. Upon detecting the release of media to the a mosphere after the disc has ruptured, system operators can shut down the system, halting the fracking process. The burst rupture disc can then be replaced with a new rupture disc within the pressure relief valve and the process can be resumed.

However, the replacement of the disc within the valve is time consuming and delays the fracturing job. Furthermore, it has been found that the forward-acting discs are often subject to fatigue failures after approximately two weeks in certain fracturing jobs due to the cycling of the system causing tension in the disc. In addition, the ninety degree bend of the vent path within the valve creates flow resistance during venting, and could direct the flow venting to undesirable areas. Accordingly, more preferred forms of pressure relief systems including devices 10 having rupture discs 30 are described hereinafter.

Figure 2B:
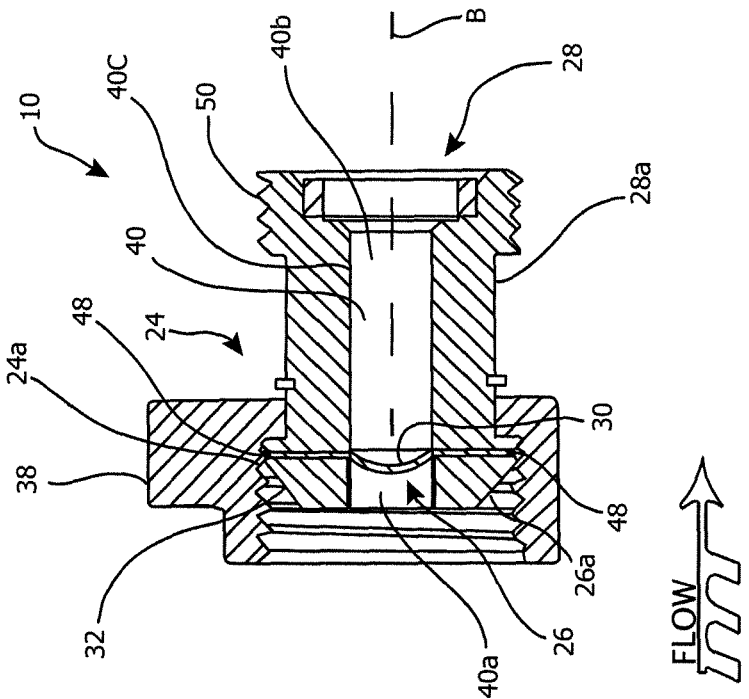
FIG. 2B is a cross-sectional view taken along line 2B-2B of FIG. 2A showing a rupture disc in the device body.
Figure 2D:
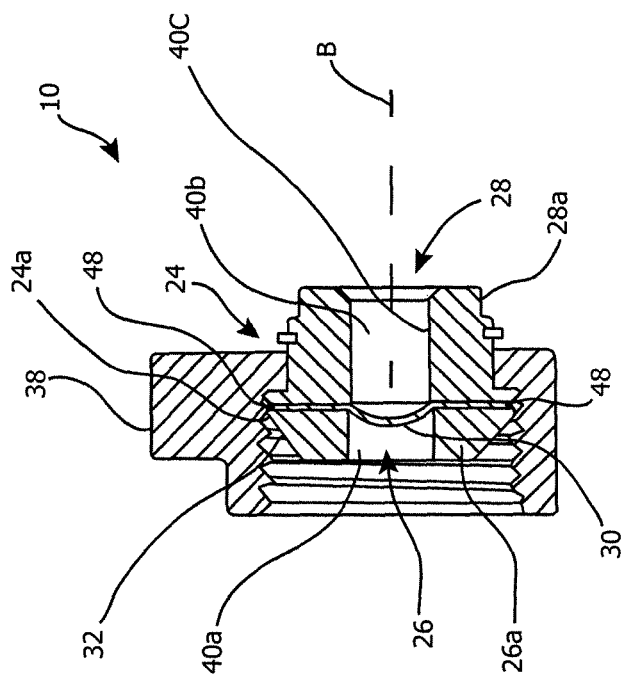
FIG. 2D is a cross-sectional view taken along line 2D-2D of FIG. 2C showing a rupture disc in the device body.
Figure 2C:
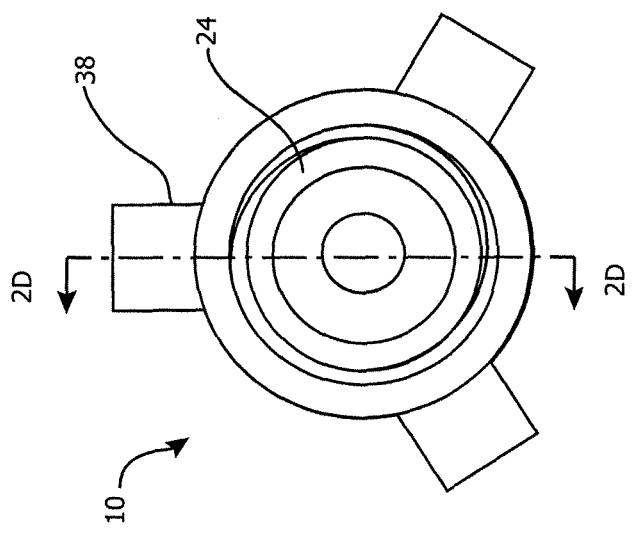
FIG. 2C is an end elevational view of another pressure relief device having a device body coupled to a nut.

With reference to FIGS. 2A-2F, the pressure relief device 10 generally includes two main portions: a device body 24, having an inlet 26 and an outlet 28 with a linearly extending through bore 40 extending therebetween, and a rupture disc 30. The device body 24 can include an inlet portion 26a and an outlet portion 28a, which can be integrally formed as a one-piece monolithic member or two distinct components or members that are rigidly connected together as by welding or the like, as shown in FIGS. 2A and 2B.

The inlet portion or member 26a has a generally annular, tapered configuration including a tapered outer surface 32 for connecting to a corresponding beveled pipe fitting 34 at a connection interface 36 to the system 12. The inlet portion 26a is attached to the interface 36 via a connector member such as a threaded nut 38. As shown, the nut 38 can include internal threads and can be of a two inch 1502 connector type in the form of a hammer union nut having three radially extending flanges 38a; however, other types and sizes of connector members may also be used, such as a three inch connector type. The outlet portion or member 28a has a generally cylindrical configuration which can include an enlarged threaded end 50 (FIG. 2B) to be of a two inch 1502 connector type, for example. The inlet portion 26a includes a bore portion 40a and the outlet portion 28a also includes a bore portion 40b that are preferably aligned with each other along a central axis B, such that the media 22 flowing through the device body 24 flows along the axis B generally without turns or bends, resulting in a direct straight vent path through the device. Preferably, the device 10 is oriented so that the vent path is vertical, but the device 10 could have other orientations as well. The diameter of the bore portions 40a and 40b can be approximately 1.25 inches. The device body 24 can be of a metal material such as Stainless Steel 316.

Figure 2E:
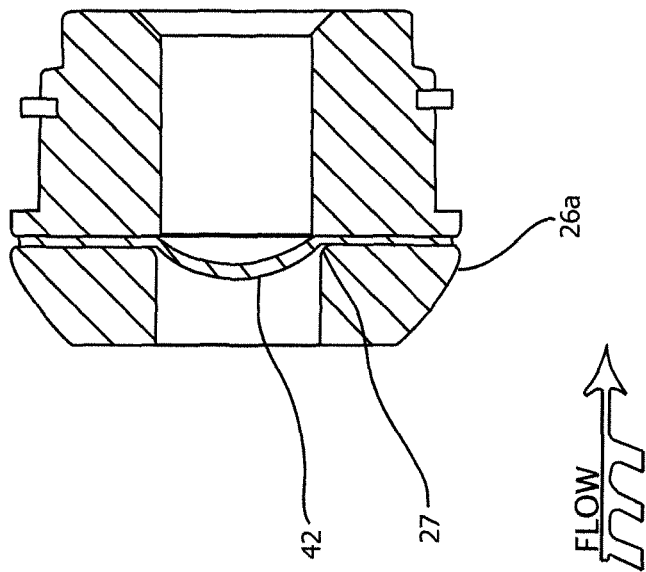
FIG. 2E is a cross-sectional view similar to FIG. 2D but with the nut removed.
Figure 2F:
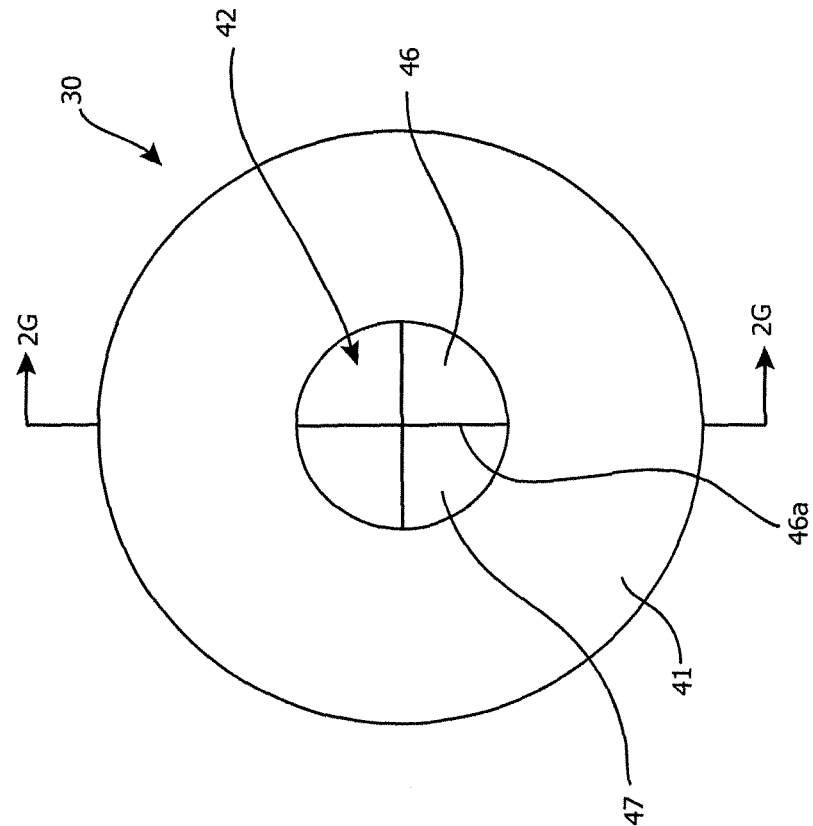
FIG. 2F is a front elevational view of the rupture disc of the pressure relief devices of FIGS. 2B and 2D.
Figure 2G:
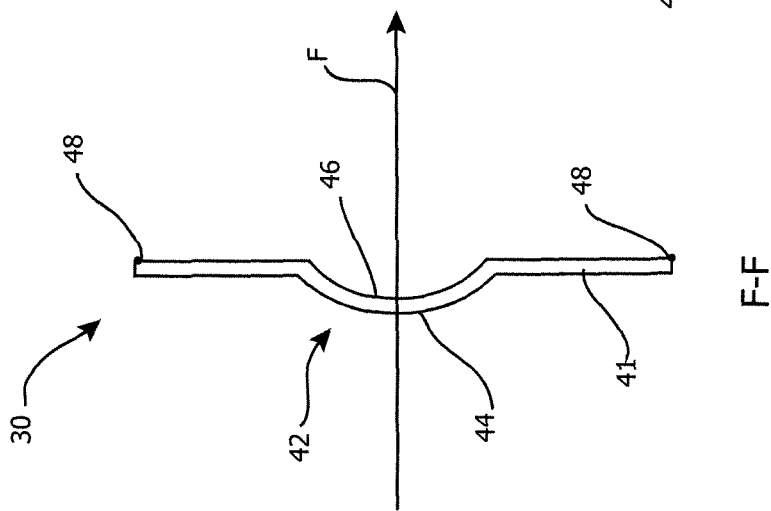
FIG. 2G is cross-sectional view taken along the line 2G-2G of FIG. 2F showing the domed-configuration of the rupture disc.

As shown in FIGS. 2F and 2G, the rupture disc 30 is generally disc-shaped including a flat, outer ring portion 41 and a domed, central wall portion 42 at the radial center. The domed wall portion 42 can be of generally constant thickness between convex surface 44 and concave surface 46 thereof. The concave surface 46 includes a frangible portion having a cross-configuration scoring 46a and the convex surface 44 is smooth. The rupture disc 30 is installed within the device body 24 adjacent the inlet 26 and oriented in a reverse-acting manner, meaning the smooth convex surface 44 is facing the inlet 26 and pressurized media 22, and the scored concave surface 46 is facing the outlet 28 so that the disc 30 projects axially in a direction opposite to fluid flow as indicated by arrow F through the device body 24 when the disc 30 ruptures. The reverse-acting installation of the rupture disc 30 is optimized for withstanding repeated pressurized cycles because the convex surface 44 faces the pressurized media 22, therefore the disc is in compression. For example, the reverse-acting installation of the disc 30 for the pressure relief device 10 described herein has been tested up to 3.5 million cycles without fatigue failures.

In addition, orienting the disc 30 in a reverse-acting orientation in the device body 27, when disc 30 ruptures, the generally triangular-shaped petal portions 47 are provided with a longer travel path in the bore 40 before reaching the interior surface 40c of the outlet member 28 extending about the bore portion 40b. This allows the petal portions 47 to develop greater momentum when the disc 30 bursts. This is of importance due to the thicker dome wall portion 42 of the rupture disc 30 herein, e.g. approximately one-eighth of an inch for a dome wall portion 42 having an approximately 1.25 inch diameter (see FIG. 9A). With the device 10 including the disc 30 described above, it is believed that when the relatively thick disc 30 bursts, the increased momentum that the petal portions 47 are able to develop over the increased length travel path provided thereto will allow them to open wider and to reside in close to flush engagement with bore surface 40c. Thus, the reverse-acting orientation of the disc 30 optimizes its ability to fully open when it bursts to provide an essentially unimpeded flow path for the over pressurized fracking fluid 22 through the straight bore 40.

The disc 30 is secured to the device body 24 via a weld 48 at the perimeter or outer surface 24a of the device body 24 to weld the disc outer ring portion 41 thereto. The weld 48 is located in a void or cavity between the device body 24 and the nut 38 that is used to connect the device 10 to the interface 36. As shown, the weld 48 is between the inlet member 26a and the outlet member 28a. The placement of the weld 48 in this position allows for sealing the rupture disc 30 without the use of elastomers. The weld 48 can be of conventional type such as a Tungsten Inert Gas weld ("TIG weld") or an electron beam weld. Locating the weld at the perimeter of the device 10 and within the cavity results in the weld being generally free from substantial tension or compression after the device 10 is installed in the system 12. In prior designs, an elastomer o-ring and a weld were used to secure the rupture disc inside the valve body, but this configuration is not as optimized in terms of its fatigue life in the harsh condition of a high pressure fracking system as described herein.

The rupture disc 30 is a metallic material such as a Hastelloy-C material. The rupture or burst pressure of one rupture disc 30 depends on various parameters including the thickness of the disc 30, the height and radius of curvature of the domed wall portion 42, and the depth of the scoring 46a in the domed wall portion 42. If the pressure exceeds the maximum rated burst pressure of the disc 30, the disc 30 will burst along the scoring 46a in a non-fragmenting manner, and the media 22 will flow past the disc 30 through the device body 24 to vent, relieving pressure in the fluid media 22. As shown in FIG. 2E, due to the configuration including the increased thickness of the dome wall portion 42, the inlet member 26a has a radiused inner corner 27 at the bore 40 adjacent the juncture of the ring portion 41 and dome wall portion 42 of the disc 30. This provides the thicker dome wall portion 42 with clearance as it extends in the bore 40 toward the valve body inlet 26.

As mentioned, the rupture disc 30 herein has a dome wall portion 42 that is of greater thickness than corresponding dome walls of prior rupture discs. As such, the scoring 46a has a preferred configuration for manufacturability, as shown in FIGS. 9A-9D. The scoring 46a is wider and deeper (e.g. approximately 0.33 inch), than in conventional rupture discs and includes a center notch 46b having inclined sides that meet with the notch 46b also having a depth of approximately the same as that of the curved score lines 46a extending in a curved radial path therefrom along the concave side of the dome wall portion 42.

The outlet portion 28a of the device body 24 can have various configurations for connecting to additional hardware. As shown, the outlet portion 28a can include a two inch 1502 threaded end 50 for attaching to additional pipes or the like, although other sizes or connection types could be used, such as a three inch threaded connection. The radially enlarged threaded end 50 (FIG. 2B) allows for the media 22 flowing through the device 10 to be re-routed through the additional pipes to another area for venting or to a holding area for future disposal. Alternatively, the outlet portion 28a is free from threading or dedicated coupling structure for being connected to additional pipes or the like (FIG. 2D), allowing the media 22 to vent to the atmosphere near the installation location of the device 10.

As mentioned above, the pressure relief device 10 can be connected at the fluid end 16 of the truck 14, the delivery line 18, or both. The device body 24 having the straight through bore 40 has a simplified and streamlined configuration over many standard valve bodies that include various bends and chambers for fluid and the moving valve components therein. In this regard, the device 10 including the rupture disc 30 welded in the valve body 24 can be of much less mass and thus much lighter than typical valve bodies. By way of example and not limitation, the device 10 herein can weigh approximately 6 pounds. For purposes of illustration, the operation of the pressure relief device 10 while attached to the delivery line 18 will be described.

With reference once again to FIG. 1, the pressure relief device 10 is generally attached to the system 12 so that the central axis B of the through bore 40a and 40b of the device body 24 can be, as illustrated, vertically oriented. The vertical orientation creates a direct vertical vent path, free from bends or turns. The vertical orientation of the straight or linearly extending vent created by the linearly extending through bore 40a is preferable when venting to atmosphere. However, when it is desired to release the overpressured fracking fluid to a holding pit, cellar or other containment area, the device 10 can be oriented at other than vertical orientations such as horizontally for being connected by threading to conduits leading to the fluid containment area. Bends or turns within the vent path generally create a flow resistance to the venting, which slows the venting process. Furthermore, highly pressurized flow through a bending vent path may result in the valve becoming unscrewed from its connection, which can lead to venting toward undesirable areas. The straight or linear vent path of the pressure relief device 10 described herein, however, is not subject to the flow resistance of a bending vent path, so venting can occur with less resistance and complete more quickly. This is in contrast to standard valve bodies that not only include bends in their vent path, but, as with pop-off valves, have a spring bias force that may be consistently urging a valve member against fluid flow thus constantly restricting flow past the valve member. For instance, testing at 15,000 psig pressure has shown that a 2 inch diameter device 10 will flow over 1,500 gallons per minute which is ten times the published flow rate of a corresponding 2 inch diameter pop-off valve, and fifty percent greater flow than a 3 inch diameter nitrogen valve. Furthermore, the vertical vent path limits the venting media to a confined area about the device 10 because the device 10 does not tend to become unscrewed.

The device 10 is attached to one of the delivery line pipes 18a at the interface 36, sealing the interior of the delivery pipe 18a from the atmosphere due to the rupture disc 30 held in the device 10. The fracking process begins, with the fluid media 22 being pumped from the truck 14 under high pressure toward the well 20 and ultimately into the rock layers. During the pumping process, the media 22 flows through the delivery line pipes 18a and past the pressure relief device 10 connected at an intermediate location therealong. The rupture disc 30 installed adjacent the inlet 26 in the reverse-acting orientation will withstand the pressure of the media 22 if the pressure is below the rated burst level of the device 10.

At the conclusion of a cycle of the fracking process, the pressure within the delivery line pipe 18a will subside, and the device 10 will remain intact and sealed. The device 10 will generally not need to be replaced before starting a new fracking cycle. The device 10 has been tested to 3.5 million cycles without requiring replacement. With a rupture disc installed in a forward-acting orientation, the disc would withstand an estimated 2.5 million cycles.

During the fracking process, the pressure within the system 12 can fluctuate, and the pressure may rise or spike above the burst level of the device 10, sometimes caused when the size of the sand is too large to fit through the perforations of the well casings or due to other blockages down hole. In the event the pressure in the fracturing fluid at the device 10 exceeds this level, the disc 30 will rupture and the media 22 will flow through the vertical vent path and vent to the atmosphere adjacent the installation location of the device 10. Alternatively, the media 22, after flowing through the vertical vent path, can be redirected to a holding area for future disposal. This venting or redirection of over-pressurized fluid relieves the over-pressure in the system 12, at least in the one delivery line pipe 18a to which the device 10 is connected.

After the disc 30 has burst, the system operators can manually shut down the system 12 including the fluid pumps on the trucks 14 to stop continued venting of the media 22 and to allow for replacement of the disc 30, or the system operators can choose to take the truck 14 that is causing the over-pressure offline from the system and continue operating the other connected trucks 14. Alternatively, and as further described below, the system 12 can automatically detect that the disc 30 has burst, and the system 12 or individual trucks 14 can be manually or automatically shut down according to settings defined by the operators.

After shutdown, the pressure relief device 10 can be replaced so that the process can resume in the affected delivery line pipe 18a. The device 10, including the disc 30 thereof, is disposable. Thus, the system operators can quickly remove the ruptured device 10 and replace it with a new device 10. This is more efficient than replacing only the burst disc 30 within the body. By making the device 10 disposable and easily replaceable, including the device body 24, system operators can more quickly resume the fracking process after a venting event. In practice, the lightweight device 10, e.g., approximately 6 pounds, only requires one person for a replacement operation versus the prior relief valve which used the bulkier and heavier standard valve body including a forward-acting rupture disc which required two people for a replacement operation.

While the device 10 has been described with reference to installation at the delivery line 18, the operation and replacement of the device 10, when installed at the fluid end 16 of a truck 14, is similar. As pressure increases above the maximum level allowed by the disc 30, the disc 30 will burst, allowing the media 22 to vent vertically to the atmosphere or be re-routed to a fluid collection and holding area for disposal.

Figure 3:
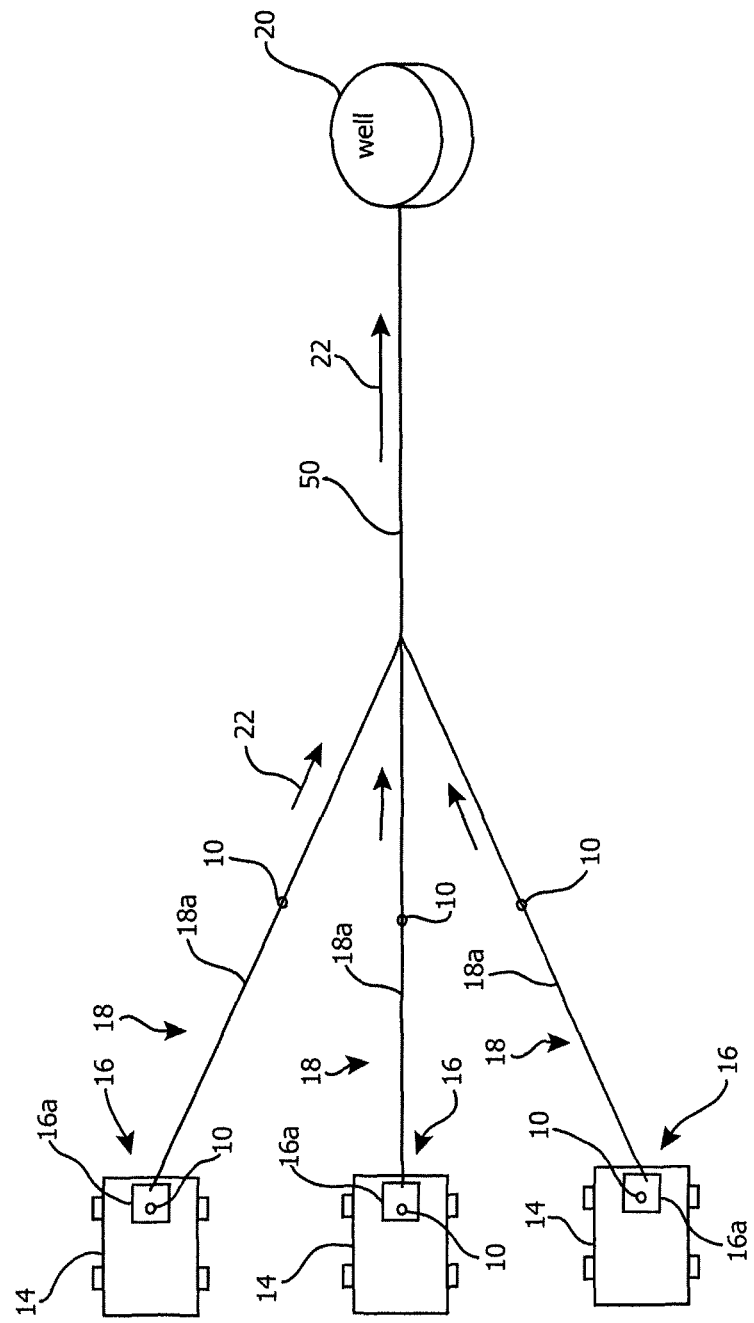
FIG. 3 is a schematic view of a hydraulic fracturing system utilizing multiple fluid delivery trucks.

With reference to FIG. 3, the fracking system 12 can generally include multiple fluid delivery trucks 14 arranged in parallel via their upstream delivery lines 18 to a common downstream delivery line 50, also known as a "missile." The common delivery line 50 feeds into the well 20, which directs the media 22 downhole for fracking. In certain fracking systems 12, twelve to twenty trucks 14 can be connected to the common delivery line 50. Each delivery line 18 associated with one of the trucks 14 can be fitted with the pressure relief device 10 to relieve pressure at different locations throughout the system 12 as desired by the system operator. The fracking process can continue even if one of the trucks 14 needs to be shut down due to rising pressure at the pumps 16a of the fluid end 16 of the truck 14 or in the delivery line 18 connected to the fluid end 16 of the truck 14.

Figure 4A:
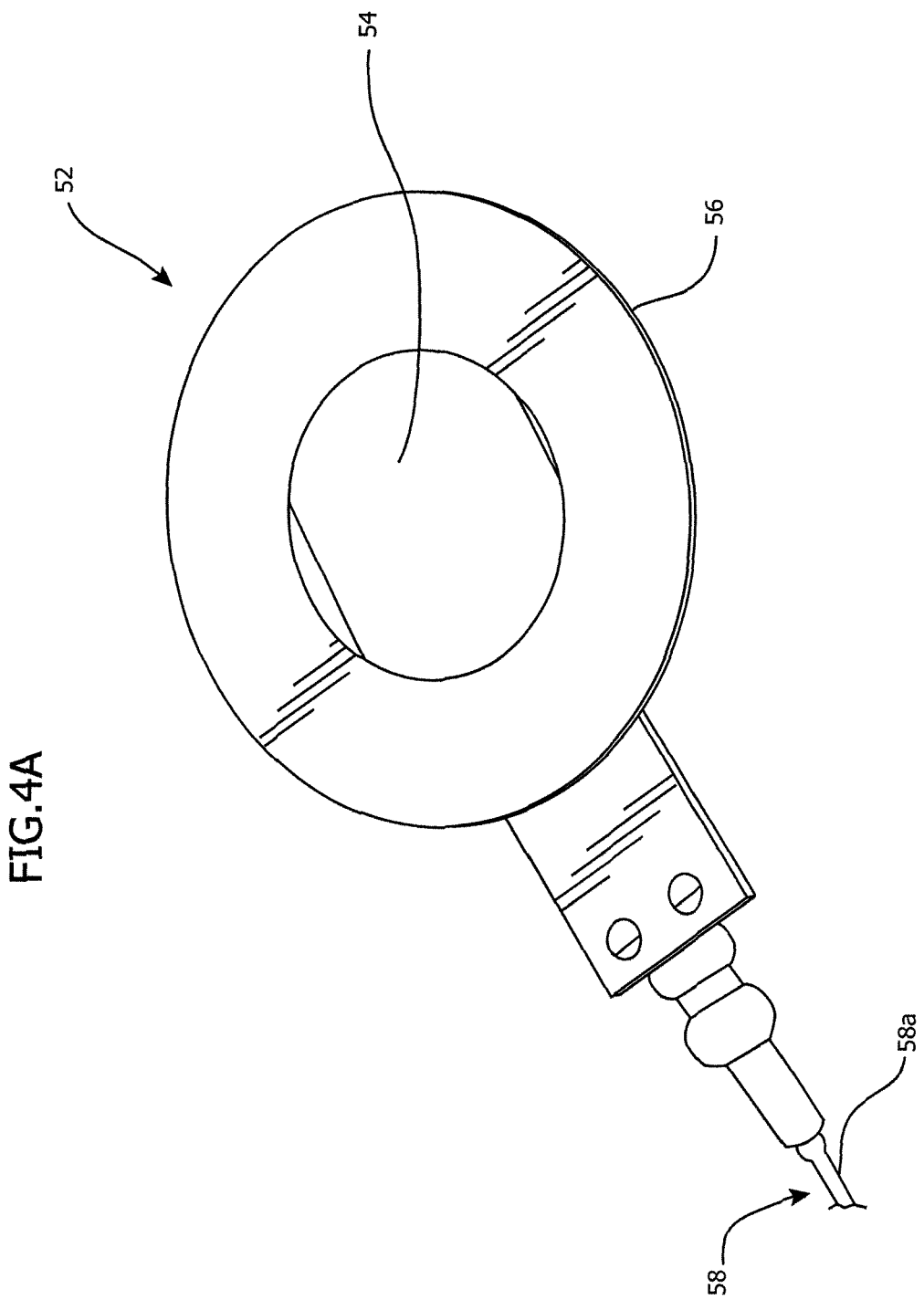
FIG. 4A is a perspective view of a sensor for a pressure relief and detector device when the rupture disc has burst.

With reference to FIGS. 4A and 4B, a modified pressure relief and detector device 10a can also include a sensor 52 that detects whether the disc 30 has burst. For this purpose, the sensor 52 can be a fluid flow sensor that detects the flow of fluid in the device 10a downstream from the disc 10.

As shown, in one example, the fluid flow sensor 52 can include a thin metal membrane 54 that will open when pressurized media 22 flows past the membrane 54. Preferably, the sensor 52 is generally disc-shaped, similar to the rupture disc 30, for fitting in the generally cylindrical through bore 40 of the device body 24. The sensor 52 includes an annular gasket 56 of non-corrosive material such as a synthetic plastic material surrounding the membrane 54. The membrane 54 is of metallic material such as Stainless Steel 316. The membrane 54 is part of a conductive electrical circuit 58 that will create an open circuit when the membrane 54 opens, which generates an over-pressure signal 59. Manifestly, other types of sensors 52 that can detect fluid flow downstream of the rupture disc 30 can be utilized.

The sensor 52 is installed within the pressure relief and detector device 10a adjacent to and downstream from the rupture disc 30. Thus, when the fluid pressure in the system 12 is high enough to cause the rupture disc 30 to burst, the media 22 will flow through the device 10 to vent, and quickly open the membrane 54 of the sensor 52. The sensor 52 is electrically connected to a PLC or similar controller 60 via lead 58a, so the controller 60 will receive the overpressure signal 59 to detect that the sensor 52 has opened. Alternatively, the sensor 52 could be in the form of a pressure sensor or pressure gauge that detects a change in pressure in the device 10a downstream of the rupture disc 30. A transducer could also be employed as the sensor 52.

Figure 5:
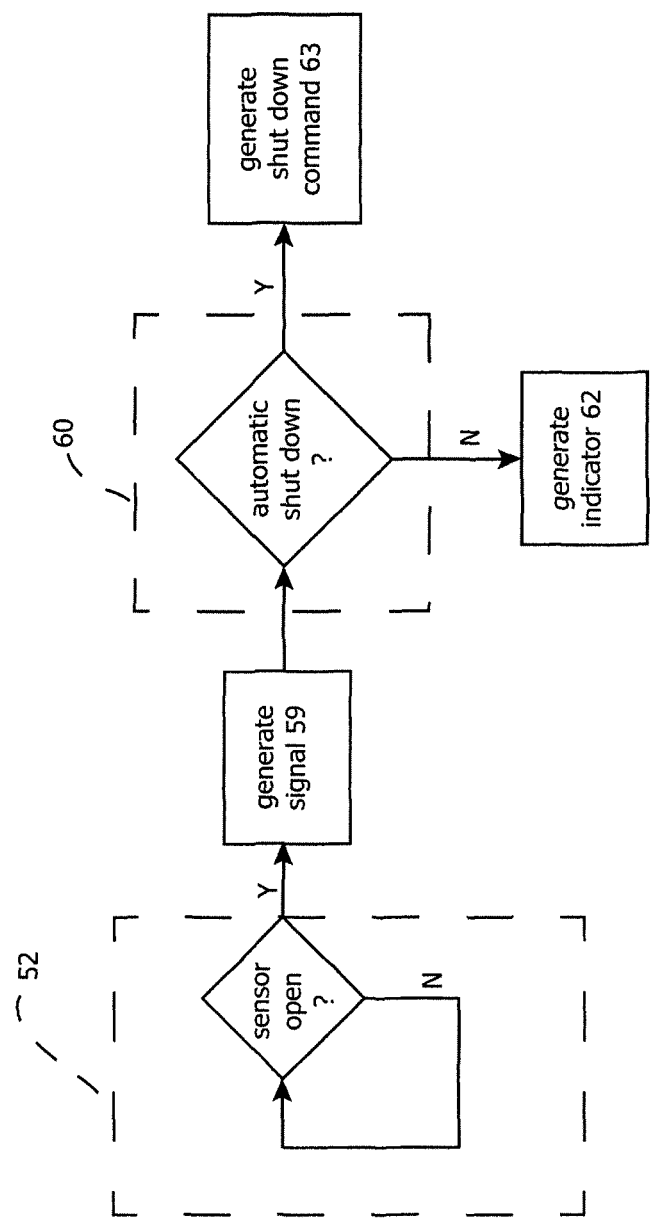
FIG. 5 is a flow chart illustrating the operation of a controller connected to the sensor of FIG. 4A.

The general operation of the sensor 52 and the controller 60 is illustrated in FIG. 5. The controller 60 will detect that the circuit 58 is open and generate a fluid overpressure indicator 62. The indicator 62 can be either visual or audible, or both, in the form of an alarm/warning that alerts the operator that the disc 30 has burst. In addition, or alternatively, an open circuit can generate an automatic shutdown signal which causes the system 12 to shutdown, and specifically shuts down the fluid pump 16a at the fluid end 16 of the truck 14, depending on the desired operation by the system operator. For example, the operator may prefer to assess the over-pressure and venting conditions to be able to decide whether to manually shut down the system 12. Alternatively, the operator may desire that the system 12 immediately shut down in the event of an over-pressure condition, and the controller can generate a shut down command 63.

The sensor 52 can also be installed separately from the pressure relief device 10 at another location of the system 12 rather than being mounted within the device body 24. In such a configuration, the sensor 52 can be installed at a location further downstream of the device 10, such as along the re-route path of the venting media 22 or within an extension connected to the device 10.

Figure 6A:
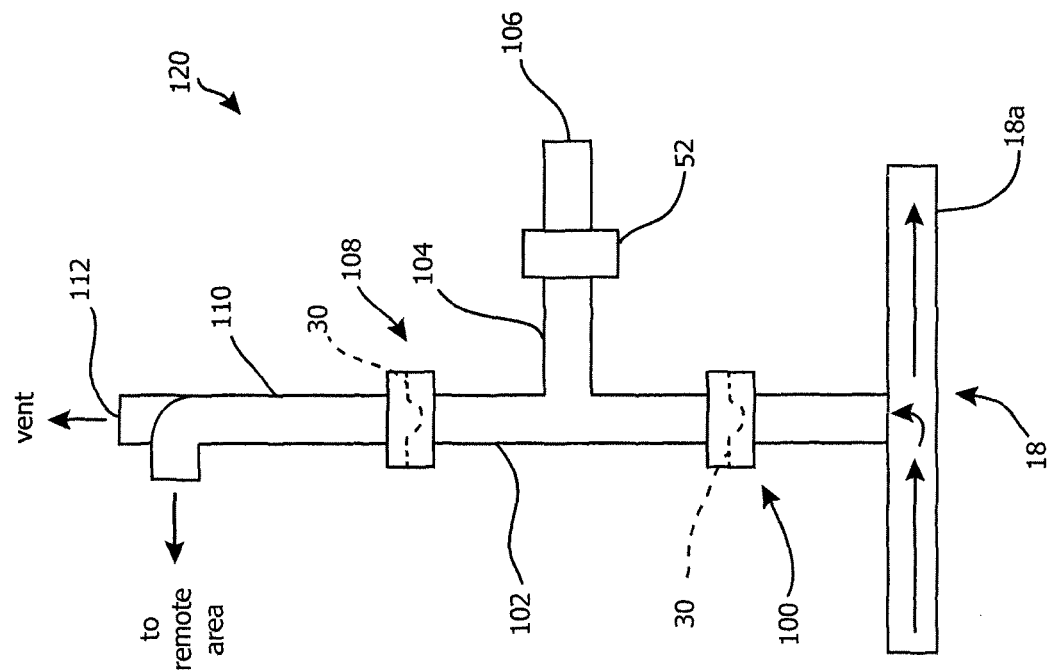
FIG. 6A is an elevational view of pressure relief and detection apparatus for a hydraulic fracturing system.
Figure 6B:
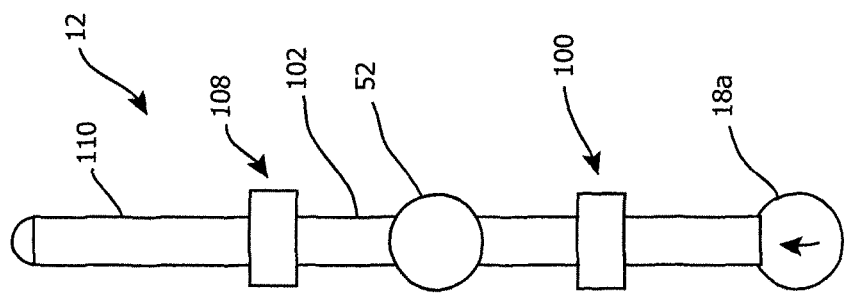
FIG. 6B is an end elevational view of the apparatus of FIG. 6A.

With reference to FIGS. 6A and 6B, a pressure relief and detector apparatus 120 is shown and includes a lower pressure relief device 100 connected to the delivery pipe 18a as described above. The rupture disc 30 of the lower device 100 is configured to have parameters that substantially cause the disc 30 to burst at an intermediate pressure level, such as a level below the maximum pressure intended to be allowed in the system 12. An intermediate pipe extension 102 is attached at the outlet end 28 of the lower device 100, extending vertically therefrom. A horizontal branch 104 extends from the vertically oriented extension 102. Other orientations for the pipe extension 102 and branch 104 could be implemented depending on system requirements. The sensor 52 is installed within the horizontal branch pipe 104 between the vertically oriented extension 102 and a closed end 106 of the horizontal branch pipe 104.

The top of the extension 102 includes an upper or higher pressure relief device 108 having a rupture disc 30 configured to have parameters that cause the disc 30 to burst at the maximum pressure intended to be allowed in the system 12. A venting extension 110 is attached to the upper device 108. The venting extension 110 can extend vertically with an open end 112 to allow venting to the atmosphere or the venting extension 110 can be configured to re-route the venting media 22 to a holding area or other remote location.

In this approach, as fluid pressure in the system 12 increases above the intermediate level, the rupture disc 30 of the lower device 100 will burst, allowing the pressurized media 22 to flow into the vertical extension 102 and the horizontal branch 104. As the media 22 flows into the horizontal branch 104, the sensor 52 will open, sending the signal 59 to the controller 60 which indicates that the intermediate pressure level was reached. After receiving the intermediate pressure signal 59, the controller 60 can generate the audible or visual caution indicator 62, or both, such as an alarm to alert the system operator that the intermediate pressure level was reached, or the intermediate pressure signal 59 could cause the controller 60 to send a shutdown command 63 to the truck 14 responsible for the overpressure condition, if desired, as illustrated in FIG. 5. In the event the controller 60 is configured to actuate the alarm indicator 62 when it receives the intermediate pressure signal 59 that doesn't automatically shut down the system 12, the system operator can choose to manually shut down the truck 14 associated with the location of the alarm. For example, if one of the trucks 14 is causing the intermediate pressure in the associated delivery line pipe 18a, but the remaining trucks 14 are operating within an acceptable range, the operator may choose to shut down the truck 14 causing the intermediate pressure, while allowing the remaining trucks 14 to complete the current fracking cycle, such as when a cycle is almost complete.

If reception of the intermediate pressure signal 59 does not cause a shutdown of the associated truck 14, the fracking process will continue after the alarm indicator 62 is actuated, because the intermediate pressure level does not necessarily require a shutdown of the truck 14 or system 12. However, in the event that the pressure continues to elevate beyond the maximum level allowed within the system 12, the rupture disc 30 of the upper device 108 will burst, and the media 22 will flow through the upper device 108 to vent to the atmosphere or be re-routed to a fluid containment area.

Thus, in this configuration, the pressure sensor 52 installed between the lower device 100 and the upper device 108 can alert the system 12 operator of an initial intermediate spike in pressure, allowing the system operator to adjust the pumping pressure or shut down the associated truck 14 where the alarm was detected before the pressure at the truck 14 or its associated delivery line 18 reaches the maximum allowable level.

Figure 7B:
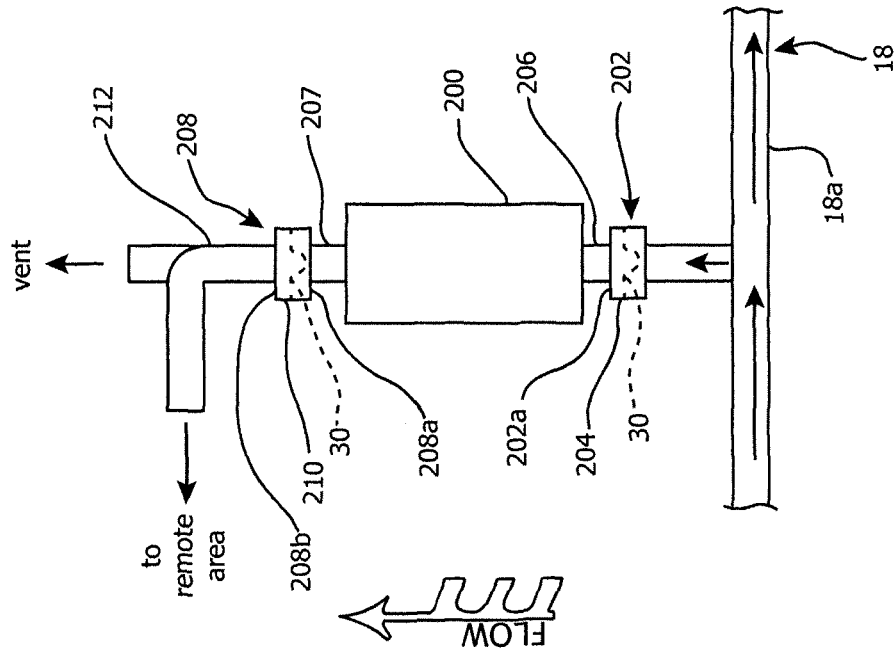
FIG. 7B is a cross-sectional view taken along the line 7B-7B of FIG. 7A showing the apparatus of FIG. 7A.
Figure 7A:
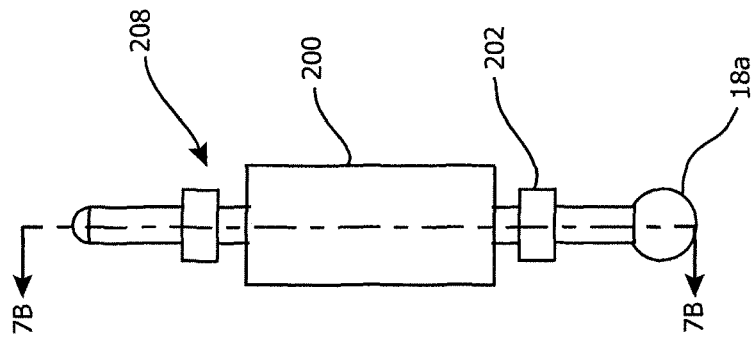
FIG. 7A is another form of a pressure relief and detector extension apparatus for a hydraulic fracturing system.

With reference to FIGS. 7A and 7B, a relief tank or vessel 200 is connected to the system 12 for providing fluid pressure and volume relief without requiring shutdown of the truck 14 associated with the over-pressure condition. A lower pressure relief device 202, including a lower sensor 204, is connected to the delivery pipe 18a. The lower device 202 is configured to have parameters that cause the rupture disc 30 to burst at a lower pressure than the maximum allowed for the system 12. The relief vessel 200 includes an inlet pipe 206 that is attached to an outlet end 202a of the lower device 202. The vessel 200 also includes an outlet pipe 207 that is attached to an inlet end 208a of an upper or higher pressure relief device 208 having an upper sensor 210. A venting extension 212 is attached to an outlet end 208b of the upper device 208 that can either vent to the atmosphere or re-route venting media 22 to a fluid containment area.

Figure 8:
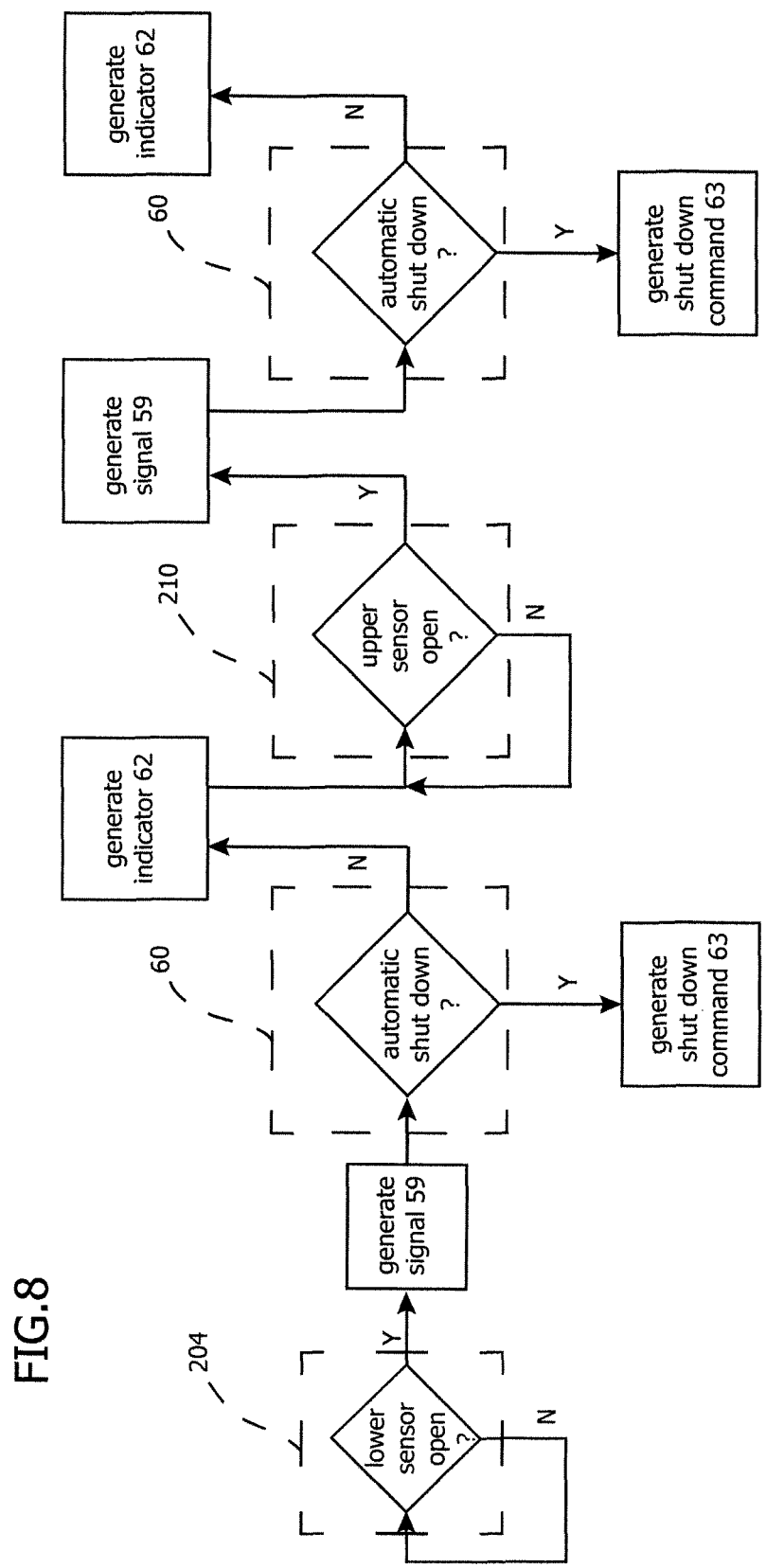
FIG. 8 is a flow chart illustrating the operation of the pressure relief and detector extension apparatus.

With reference to FIGS. 7A, 7B, and 8, as the pump 16a at the fluid end 16 of the truck 14 in the system 12 is pumping pressurized media 22 through the delivery line pipes 18a, the media 22 will flow past the lower device 202 and toward the well 20. In the event the pressure rises to a level sufficient, the rupture disc 30 of the lower device 202 will burst, and media 22 will flow through the straight, and as illustrated, vertical vent path of the lower device 202. The flowing media 22 will cause the lower sensor 204 to open, generating the intermediate pressure signal 59 received by the controller 60.

Depending on the configuration of the controller 60, the controller 60 can cause the pump or pumps 16a at the fluid end 16 of the truck 14 associated with delivery pipe 18a having the burst lower device 202 to shut down, or it can allow this truck 14 to continue its pumping operation, treating the intermediate pressure signal 59 as a warning. If the intermediate pressure signal 59 is treated as a warning, the controller 60 will generate the warning indicator 62, either audible or visual, or both, so that the system operator will be warned and can choose to manually shut down the associated truck 14, if desired. In this regard, the accumulation vessel 200 provides the operator with extra time for shutting down the pump 16a that is feeding fluid to delivery line 18 having the over-pressurized fracking fluid condition therein. If the controller 60 is configured to automatically shut down the associated truck, the controller will generate the shutdown command 63. By manually or automatically shutting down the truck 14 responsible for the higher pressure, the fracking process can continue by allowing the other trucks 14 connected to the system 12 to continue their fracking fluid pumping operations.

After the lower device 202 has burst, the pressurized media 22 will flow through the lower device 202 and into the vessel 200 to accumulate the pressurized fracturing fluid media 22 therein. As shown, the vessel 200 can be radially enlarged relative to the inlet and outlet pipes 206 and 207. By way of example and not limitation, the vessel 200 can be approximately 18-24 inches in diameter, 4-6 feet long, and can hold approximately 40-50 gallons of fluid. The vessel 200 provides both pressure and volume relief. The pressure in the area of the lower device 202 will drop due to the added volume of the vessel 200, and the media 22 entering the vessel 200 reduces the pressure in the associated delivery line 18.

In the event the pressure continues to rise and the truck 14 has not been shut down, the media 22 will continue to accumulate in the vessel 200 until the fluid pressure rises high enough to cause the rupture disc 30 in the upper device 208 to burst. The upper sensor 210 will open and generate the overpressure signal 59 which will be received by the controller 60. When the controller 60 receives the signal 59 this indicates that the fluid pressure in the area of the upper device 208 exceeded the maximum pressure allowed. The controller 60 can be programmed to automatically shut down the system 12 by generating the shutdown command 63, or it can be programmed to generate the warning indicator 62 that will alert the system operator to the system overpressure condition, who then can manually shut down the system 12. The media 22 venting from the upper device 10 can either vent to the atmosphere or be re-routed to a containment area.

Thus, the use of the lower device 202 and the upper device 208, set at different burst levels, allows for the intermediate signal 59 to be sent to the controller 60 prior to pressure reaching the maximum level. Depending on the needs of the system operator, the associated truck 14 can be shut down automatically or manually before the pressure in that area exceeds the maximum allowable level. This configuration can allow the overall fracking process to continue while the truck 14 causing the over-pressurization is brought offline.

Much of the above description has described the use of pressure relief devices 10 and associated components at the fluid delivery line 18. These same devices 10 and components can also be connected to the fluid end 16 of the fluid delivery trucks 14. When positioned at this location, the devices 10 will similarly relieve pressure buildup at the fluid end 16 of the truck 14, sending signals 59 to the controller 60 for subsequent indicator 62 or shutdown command 63 generation, and venting or re-routing the media 22 as necessary.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A pressure relief device for relieving over-pressure conditions in high pressure fluid delivery systems, the pressure relief device comprising:
   a valve body having an inlet and an outlet, and a linearly extending throughbore having opposite ends at which the inlet and outlet are disposed, the valve body being two distinct inlet and outlet members;
   a rupture disc welded to the valve body between the inlet and outlet members so that the rupture disc is secured to the valve body via a weld and is disposed along the linearly extending throughbore spaced from the opposite ends of the throughbore at which the inlet and outlet are disposed;
   a frangible dome wall portion of the rupture disc having a reverse-acting orientation in the valve body bore to have a convex side thereof facing the inlet of the valve body with the valve body throughbore having only the frangible dome wall portion therein;

a flat, outer ring portion of the rupture disc extending about the frangible dome wall portion thereof; and an annular wall of one of the inlet and outlet members having a predetermined radial thickness, a radially inner annular surface extending about the throughbore, a radially outer surface, and an end surface extending for substantially the full predetermined radial thickness of the annular wall between the radially inner and outer surfaces and supporting and securing the rupture disc outer ring portion thereon.

2. The pressure relief device of claim 1 wherein the dome wall portion of the rupture disc has a concave side opposite the convex side, and scoring in the concave side configured such that when a predetermined fluid pressure is reached on the convex side, the dome wall portion will break open in a predetermined manner.

3. The pressure relief device of claim 1 wherein the inlet member has a radiused corner at the throughbore between the end surface and the radially inner annular surface with the juncture of the flat, ring portion and dome wall portion of the rupture disc adjacent thereto so that the radiused corner provides clearance for the dome wall portion.

4. The pressure relief device of claim 1 wherein the valve body and rupture disc together weigh approximately six pounds.

5. A pressure relief device for relieving over-pressure conditions in high pressure fluid delivery systems, the pressure relief device comprising:

a valve body having an inlet and an outlet, and a linearly extending throughbore therebetween;

a rupture disc secured in the valve body;

a frangible dome wall portion of the rupture disc having a reverse-acting orientation in the valve body bore to have a convex side thereof facing the inlet of the valve body, wherein the dome wall portion of the rupture disc has a concave side opposite the convex side; and scoring in the concave side configured such that when a predetermined fluid pressure is reached on the convex side, the dome wall portion will break open in a predetermined manner, wherein the scoring includes a center notch and curved radial score lines extending from the notch in the dome wall portion.

6. A hydraulic fracturing system comprising:

at least one pump for pressurizing fracturing fluid;

at least one delivery line downstream from the pump for receiving the pressurized fracturing fluid for travel in a downstream direction and delivering the pressurized fracturing fluid to a well;

at least one pressure relief device installed along the delivery line downstream from the pump, and being oriented so that a flow path through the pressure relief device is transverse to the downstream travel direction of the pressurized fracturing fluid in the delivery line, the pressure relief device being operable to allow the pressurized fracturing fluid to flow therethrough transverse to the downstream travel direction when the fluid pressure in the delivery line increases to reach an over-pressurized condition therein; and a sensor for detecting fluid flow downstream of the pressure relief device flow path and for allowing the pump to be shut down when the downstream fluid flow is detected.

7. The hydraulic fracturing system of claim 6 wherein the sensor is a pressure gauge or transducer.

8. The hydraulic fracturing system of claim 6 including a controller connected to the sensor and configured to generate an indicator signal when the fluid has reached the predetermined pressure to allow an operator to shut down the pump or configured to cause the pump to automatically shut down when the fluid has reached the predetermined pressure.

9. The hydraulic fracturing system of claim 6 wherein the pressure relief device comprises a lower pressure relief device and a higher pressure relief device downstream from the lower pressure relief device with the lower pressure relief device configured to allow pressurized fracturing fluid to flow therethrough at a predetermined lower pressure which is lower than a predetermined higher pressure at which the pressurized fracturing fluid is allowed to flow through the higher pressure relief device.

10. The hydraulic fracturing system of claim 9 wherein the sensor is disposed between the lower pressure and higher pressure relief devices for allowing an operator to adjust pumping pressure at the pump or to shut down the pump based on the pressurized fracturing fluid being at or above the predetermined lower pressure but below the predetermined higher pressure.

11. The hydraulic fracturing system of claim 6 wherein the pump is operable to generate pressures of the fracturing fluid of approximately 6,000 psig to approximately 15,500 psig.

12. The hydraulic fracturing system of claim 6 wherein the pressure relief device is installed adjacent the pump along the delivery line, adjacent the well along the delivery line, or anywhere therebetween.

13. A hydraulic fracturing system comprising:

at least one pump for pressurizing fracturing fluid;

at least one delivery line for receiving the pressurized fracturing fluid and delivering the pressurized fracturing fluid to a well;

at least one pressure relief device installed along the delivery line, operable to allow the pressurized fracturing fluid to flow therethrough when the fluid reaches a predetermined pressure; and a sensor for detecting fluid flow downstream of the pressure relief device and for allowing the pump to be shut down when the downstream fluid flow is detected, wherein the sensor has a conductive electric circuit including a conductive membrane configured such that when the membrane is opened by fluid flow downstream from the pressure relief device, the circuit will generate a signal to indicate that the fluid has reached the predetermined pressure for flowing through the pressure relief device.

14. A hydraulic fracturing system comprising:

at least one pump for pressurizing fracturing fluid;

at least one delivery line for receiving the pressurized fracturing fluid and delivering the pressurized fracturing fluid to a well;

at least one pressure relief device installed along the delivery line, operable to allow the pressurized fracturing fluid to flow therethrough when the fluid reaches a predetermined pressure; and a sensor for detecting fluid flow downstream of the pressure relief device and for allowing the pump to be shut down when the downstream fluid flow is detected, wherein the pressure relief device includes a body and a domed rupture disc in the body, and the sensor is installed in the body.

15. A hydraulic fracturing system comprising:
at least one pump for pressurizing fracturing fluid;
at least one delivery line for receiving the pressurized fracturing fluid and delivering the pressurized fracturing fluid to a well;
at least one pressure relief device installed along the delivery line, operable to allow the pressurized fracturing fluid to flow therethrough when the fluid reaches a predetermined pressure;
a sensor for detecting fluid flow downstream of the pressure relief device and for allowing the pump to be shut down when the downstream fluid flow is detected,
wherein the pressure relief device comprises a lower pressure relief device and a higher pressure relief device downstream from the lower pressure relief device with the lower pressure relief device configured to allow pressurized fracturing fluid to flow therethrough at a predetermined lower pressure which is lower than a predetermined higher pressure at which the pressurized fracturing fluid is allowed to flow through the higher pressure relief device; and
a radially enlarged accumulation vessel in fluid communication between the lower pressure and the higher pressure relief devices.

16. A hydraulic fracturing system comprising:
at least one pump for pressurizing fracturing fluid;
at least one delivery line downstream from the pump for receiving the pressurized fracturing fluid and delivering the pressurized fracturing fluid to a well; and
at least one pressure relief device installed along the delivery line downstream from the pump, and having a reverse-acting domed rupture disc secured at a predetermined location in the pressure relief device and operable to rupture to allow the pressurized fracturing fluid to flow therethrough away from the well when the fluid pressure in the delivery line increases to reach an over-pressurized condition therein with the domed rupture disc remaining secured at the predetermined location after rupturing.

17. The hydraulic fracturing system of claim 16 including a sensor for detecting fluid flow downstream of the pressure relief device and for allowing the pump to be shut down when the downstream fluid flow is detected.

18. The hydraulic fracturing system of claim 16 wherein the pressure relief device is installed adjacent the pump along the delivery line, adjacent the well along the delivery line, or anywhere therebetween.

* * * * *